United States Patent
Hama et al.

(10) Patent No.: US 10,835,887 B2
(45) Date of Patent: Nov. 17, 2020

(54) PROCESS FOR PRODUCING WATER-ABSORBING RESIN PARTICLES

(71) Applicant: SUMITOMO SEIKA CHEMICALS CO., LTD., Hyogo (JP)

(72) Inventors: Maoki Hama, Himeji (JP); Koji Takagi, Himeji (JP); Kenta Kumazawa, Himeji (JP); Sho Isokawa, Himeji (JP)

(73) Assignee: SUMITOMO SEIKA CHEMICALS CO., LTD (JP)

( * ) Notice: Subject to any disclaimer, the term of this patent is extended or adjusted under 35 U.S.C. 154(b) by 0 days.

(21) Appl. No.: 16/080,998

(22) PCT Filed: Feb. 8, 2017

(86) PCT No.: PCT/JP2017/004528
§ 371 (c)(1),
(2) Date: Aug. 29, 2018

(87) PCT Pub. No.: WO2017/150108
PCT Pub. Date: Sep. 8, 2017

(65) Prior Publication Data
US 2019/0030512 A1 Jan. 31, 2019

(30) Foreign Application Priority Data
Mar. 2, 2016 (JP) ................... 2016-039799

(51) Int. Cl.
| | |
|---|---|
| *C08F 20/06* | (2006.01) |
| *C08F 2/32* | (2006.01) |
| *B01J 20/26* | (2006.01) |
| *B01J 20/28* | (2006.01) |
| *B01J 20/30* | (2006.01) |

(52) U.S. Cl.
CPC ....... *B01J 20/261* (2013.01); *B01J 20/28004* (2013.01); *B01J 20/28016* (2013.01); *B01J 20/3085* (2013.01); *C08F 2/32* (2013.01); *C08F 20/06* (2013.01)

(58) Field of Classification Search
CPC ............. B01J 20/262; B01J 20/28004; B01J 20/28016; C08F 2/32; C08F 20/06
USPC ........................................... 526/193
See application file for complete search history.

(56) References Cited

U.S. PATENT DOCUMENTS

| | | | |
|---|---|---|---|
| 5,998,553 A * | 12/1999 | Iida | ............... C08F 2/32 526/193 |
| 2007/0276061 A1 | 11/2007 | Tanaka et al. | |
| 2014/0127510 A1 | 5/2014 | Handa et al. | |
| 2014/0243478 A1 | 8/2014 | Heguri et al. | |

FOREIGN PATENT DOCUMENTS

| | | |
|---|---|---|
| CN | 103857705 A | 6/2014 |
| EP | 2 765 144 A1 | 8/2014 |
| JP | H04-036304 A | 2/1992 |
| JP | H11-005808 A | 1/1999 |
| JP | 2001-002713 A | 1/2001 |
| JP | 2005-112979 A | 4/2005 |
| JP | 2005-238224 A | 9/2005 |
| JP | 2006-143766 A | 6/2006 |
| JP | 2013-100543 A | 5/2013 |
| WO | WO 2011/065368 A1 | 3/2011 |
| WO | WO 2013/018571 A1 | 2/2013 |
| WO | WO 2013/125279 A1 | 8/2013 |

OTHER PUBLICATIONS

Supplemental European Search Report issued for Counterpart European Patent Application No. 17 75 9579 (dated Oct. 14, 2019).
International Search Report in corresponding International Application No. PCT/JP2017/004528, dated May 9, 2017.
Office Action issued in Counterpart Chinese Patent Appln. No. 201780009660.8 (dated Mar. 12, 2020).

* cited by examiner

*Primary Examiner* — William K Cheung
(74) *Attorney, Agent, or Firm* — Knobbe, Martens, Olson & Bear, LLP

(57) ABSTRACT

The present invention provides a method for producing water-absorbent resin particles that has a low stirring load, and can produce water-absorbent resin particles having a particle diameter within a specific range, with high productivity. The method for producing water-absorbent resin particles comprises adding an ethylenically unsaturated monomer all at once to a hydrocarbon dispersion medium mixed with a surfactant to perform reversed phase suspension polymerization, wherein the reversed phase suspension polymerization is performed in one step, or two or more steps, the surfactant is at least one selected from the group consisting of polyoxyethylene alkyl ether phosphates, alkali metal salts of polyoxyethylene alkyl ether phosphates, and alkaline earth metal salts of polyoxyethylene alkyl ether phosphates, and the surfactant has an HLB of 9 to 15.

5 Claims, No Drawings

PROCESS FOR PRODUCING WATER-ABSORBING RESIN PARTICLES

This international application is a Section 371 National Stage Application of International Application No. PCT/JP2017/004528, filed Feb. 8, 2017, which claims the benefit of Japanese Patent Application No. 2016-039799 filed on Mar. 2, 2016 with the Japan Patent Office, the entire disclosures of which are incorporated herein by reference.

TECHNICAL FIELD

The present invention relates to a method for producing water-absorbent resin particles. More particularly, the present invention relates to a method for producing water-absorbent resin particles that has a low stirring load in a polymerization step during production, thereby achieving a reduction in the load on a polymerization apparatus and a savings in electric power costs.

BACKGROUND ART

Water-absorbent resin particles have been used in applications including hygienic materials such as disposable diapers and sanitary articles, agricultural and horticultural materials such as water-retaining materials and soil conditioners, and industrial materials such as water-blocking materials for cables and materials for preventing dew condensation. In addition to these applications, the range of applications in which water-absorbent resin particles are used has recently further expanded, including animal waste treatment materials such as pet sheets and toilet formulations for dogs or cats, portable toilets, aromatic agents, drip-absorbing sheets for meats, and formulations for moisturizing cosmetics. Water-absorbent resin particles used for these applications are required to have a particle diameter suitable for each application.

A mainstream method for producing water-absorbent resin particles is one that involves polymerizing an ethylenically unsaturated monomer, because the method is simple, and imparts high performance to the resulting water-absorbent resin particles. Examples of polymerization methods include aqueous polymerization in which an aqueous solution of an ethylenically unsaturated monomer is polymerized to obtain a hydrous gel, which is subsequently ground and dried; and reversed phase suspension polymerization in which an aqueous solution of an ethylenically unsaturated monomer is subjected to suspension polymerization by being dispersed in a hydrophobic organic dispersion medium such as a hydrocarbon dispersion medium, in the presence of a surfactant, to obtain a hydrous gel, which is subsequently dried.

In aqueous polymerization, because the polymerized hydrous gel is in the form of viscous masses, the grinding and drying steps are cumbersome, and fine particles tend to be produced by the grinding step, which makes it difficult to obtain water-absorbent resin particles with a suitable particle diameter.

On the other hand, reversed phase suspension polymerization can control the size of the particles according to the size of droplets of the ethylenically unsaturated monomer dispersed in a hydrocarbon dispersion medium. Thus, various techniques for controlling the particle diameter have been proposed mainly based on reversed phase suspension polymerization.

In particular, methods for achieving a suitable particle diameter using surfactants are known, which include, for example, a method that uses sorbitan fatty acid esters, polyglycerin fatty acid esters, and sucrose fatty acid esters (Patent Literature 1: WO 2013/018571), a method that uses trehalose fatty acid esters (Patent Literature 2: JP 2013-100543 A), and a method that uses phosphate-based surfactants (Patent Literature 3: JP H11-005808 A).

CITATION LIST

Patent Literature

Patent Literature 1: WO 2013/018571
Patent Literature 2: JP 2013-100543 A
Patent Literature 3: JP H11-005808 A

SUMMARY OF INVENTION

Technical Problem

In the production of water-absorbent resin particles using reversed phase suspension polymerization, if the stirring load in a polymerization step is high, the load on a polymerization apparatus increases, and electric power costs also increase, which is undesirable in that the productivity of the water-absorbent resin particles decreases. Furthermore, if the stirring load is high, it is difficult to achieve a particle diameter within a specific range suitable for intended use.

Moreover, if reversed phase suspension polymerization uses dropping polymerization in which an ethylenically unsaturated monomer is sequentially added dropwise, the productivity becomes poor, and this method is unsuitable for industrial production.

It is an object of the present invention to provide a method for producing water-absorbent resin particles that has a low stirring load, and can produce water-absorbent resin particles having a particle diameter within a specific range, with high productivity.

Solution to Problem

To produce water-absorbent resin particles using reversed phase suspension polymerization, the inventors of the present invention performed reversed phase suspension polymerization of an ethylenically unsaturated monomer as follows: A polyoxyethylene alkyl ether phosphate, an alkali metal salt thereof, or an alkaline earth metal salt thereof for use as a surfactant was mixed into a hydrocarbon dispersion medium, the ethylenically unsaturated monomer was added thereto all at once and dispersed in the hydrocarbon dispersion medium, and then a radical polymerization initiator was used to perform reversed phase suspension polymerization of the ethylenically unsaturated monomer. As a result, the inventors found that because the stirring load in the polymerization step is low, the load on the polymerization apparatus can be reduced, and electric power costs can be saved.

In summary, the present invention includes embodiments as set forth below:

Item 1. A method for producing water-absorbent resin particles comprising adding an ethylenically unsaturated monomer all at once to a hydrocarbon dispersion medium mixed with a surfactant to perform reversed phase suspension polymerization, wherein the reversed phase suspension polymerization is performed in one step, or two or more steps; the surfactant is at least one selected from the group consisting of polyoxyethylene alkyl ether phosphates, alkali metal salts of polyoxyethylene alkyl ether phosphates, and alkaline earth metal salts of polyoxyethylene alkyl ether phosphates; and the surfactant has an HLB of 9 to 15.

As used herein, the phrase "adding an ethylenically unsaturated monomer all at once" means that the polymerization is started after all the ethylenically unsaturated monomer is added to the dispersion medium. When the polymerization is performed in two or more steps, for each step of polymerization, the polymerization is started after all the ethylenically unsaturated monomer is added to the dispersion medium.

Item 2. The method for producing water-absorbent resin particles according to item 1, wherein the surfactant is a polyoxyethylene alkyl ether phosphate sodium salt.

Item 3. The method for producing water-absorbent resin particles according to item 1 or 2, wherein the surfactant is used in an amount of 0.1 to 3.0 parts by mass per 100 parts by mass of the ethylenically unsaturated monomer.

Item 4. The method for producing water-absorbent resin particles according to any one of items 1 to 3, wherein the ethylenically unsaturated monomer is at least one selected from the group consisting of (meth)acrylic acid and salts thereof.

Advantageous Effects of Invention

In accordance with the present invention, because the stirring load in a polymerization step is low in the production of water-absorbent resin particles, the load on the polymerization apparatus can be reduced, electric power costs can be saved, and water-absorbent resin particles having a particle diameter within a specific range can be produced. Furthermore, high productivity is achieved because the ethylenically unsaturated monomer is added all at once during the production.

DESCRIPTION OF EMBODIMENTS

1. Method for Producing Water-Absorbent Resin Particles

A method for producing water-absorbent resin particles according to the present invention comprises adding an ethylenically unsaturated monomer all at once to a hydrocarbon dispersion medium mixed with a surfactant to perform reversed phase suspension polymerization, wherein the reversed phase suspension polymerization is performed in one step, or two or more steps; the surfactant is at least one selected from the group consisting of polyoxyethylene alkyl ether phosphates, alkali metal salts thereof, and alkaline earth metal salts thereof; and the surfactant has an HLB of 9 to 15.

The method for producing water-absorbent resin particles according to the present invention will be hereinafter described in detail.

Ethylenically Unsaturated Monomer

Examples of the ethylenically unsaturated monomer to be used in the present invention include (meth)acrylic acid ("acryl" and "methacryl" are herein collectively referred to as "(meth)acryl"; the same applies below) and salts thereof; 2-(meth)acrylamido-2-methylpropanesulfonic acid and salts thereof; nonionic monomers such as (meth)acrylamide, N,N-dimethyl(meth)acrylamide, 2-hydroxyethyl(meth)acrylate, N-methylol(meth)acrylamide, and polyethylene glycol mono(meth)acrylate; and amino group-containing unsaturated monomers such as N,N-diethylaminoethyl(meth)acrylate, N,N-diethylaminopropyl(meth)acrylate, and diethylaminopropyl(meth)acrylamide, as well as quaternary compounds thereof. These ethylenically unsaturated monomers may be used alone or in combinations of two or more.

Among the above, (meth)acrylic acid and salts thereof, (meth)acrylamide, and N,N-dimethylacrylamide are preferably used, because they are readily industrially available. (Meth)acrylic acid and salts thereof are more preferably used, because they impart high water-absorption ability to the resulting water-absorbent resin particles.

Among these ethylenically unsaturated monomers, acrylic acid and salts thereof are widely used as raw materials of water-absorbent resin particles. Copolymers of acrylic acid and salts thereof with other ethylenically unsaturated monomers mentioned above may also be used. In this case, acrylic acid or a salt thereof as a main ethylenically unsaturated monomer is preferably used in an amount of 70 to 100 mol % based on the total amount of ethylenically unsaturated monomers.

At the time of reversed phase suspension polymerization, the ethylenically unsaturated monomer may be used in the form of an aqueous solution to increase the dispersion efficiency in the hydrocarbon dispersion medium. The concentration of the ethylenically unsaturated monomer in the aqueous solution may be typically 20% by mass or more and not more than the saturation concentration, preferably 25 to 70% by mass, and more preferably 30 to 55% by mass, but is not particularly limited thereto.

When the ethylenically unsaturated monomer has an acid group such as (meth)acrylic acid or 2-(meth)acrylamido-2-methylpropanesulfonic acid, the acid group may be neutralized in advance with an alkaline neutralizing agent, as required. Examples of such alkaline neutralizing agents include, but are not particularly limited to, alkali metal salts such as sodium hydroxide, sodium carbonate, sodium hydrogen carbonate, potassium hydroxide, and potassium carbonate; and ammonia. In particular, these alkaline neutralizing agents may be used in the form of aqueous solutions to facilitate the neutralization operation. The above-mentioned alkaline neutralizing agents may be used alone or in combinations of two or more.

While the degree of neutralization of the ethylenically unsaturated monomer with an alkaline neutralizing agent is not particularly limited, the degree of neutralization of all acid groups in the ethylenically unsaturated monomer is typically preferably 10 to 100 mol %, and more preferably 30 to 80 mol %, in order to increase the osmotic pressure of the resulting water-absorbent resin particles to increase the water-absorption ability, and eliminate problems with safety and the like due to the presence of excess alkaline neutralizing agent.

Radical Polymerization Initiator

Examples of the radical polymerization initiator to be used in the present invention include persulfates such as potassium persulfate, ammonium persulfate, and sodium persulfate; peroxides such as methyl ethyl ketone peroxide, methyl isobutyl ketone peroxide, di-t-butyl peroxide, t-butyl cumyl peroxide, t-butyl peroxyacetate, t-butyl peroxyisobutyrate, t-butyl peroxypivalate, and hydrogen peroxide; and azo compounds such as 2,2'-azobis(2-amidinopropane) dihydrochloride, 2,2'-azobis[2-(N-phenylamidino)propane] dihydrochloride, 2,2'-azobis[2-(N-allylamidino)propane] dihydrochloride, 2,2'-azobis{2-[1-(2-hydroxyethyl)-2-imidazolin-2-yl]propane}dihydrochloride, 2,2'-azobis{2-methyl-N-[1,1-bis(hydroxymethyl)-2-hydroxyethyl]propionamide}, 2,2'-azobis[2-methyl-N-(2-hydroxyethyl)-propionamide], and 4,4'-azobis(4-cyanovaleric acid).

Among these radical polymerization initiators, potassium persulfate, ammonium persulfate, sodium persulfate, and 2,2'-azobis(2-amidinopropane) dihydrochloride are preferred because they are readily available and easy to handle.

These radical polymerization initiators may be used alone or in combinations of two or more.

The amount of the radical polymerization initiator used is preferably 0.005 to 1 mol per 100 mol of the ethylenically unsaturated monomer. If the amount used is smaller than 0.005 mol, the polymerization reaction may require a great deal of time. If the amount used is over 1 mol, an abrupt polymerization reaction may occur.

The radical polymerization initiator may also be used as a redox polymerization initiator in combination with a reducing agent such as sodium sulfite, sodium hydrogensulfite, ferrous sulfate, or L-ascorbic acid.

Chain Transfer Agent

A chain transfer agent may also be added to control the water-absorption ability of the water-absorbent resin particles. Examples of such chain transfer agents include hypophosphorous acid salts, thiols, thiolic acids, secondary alcohols, and amines.

Internal-Crosslinking Agent

A crosslinking agent may be added, as required, to the ethylenically unsaturated monomer for polymerization. Examples of the crosslinking agent (internal-crosslinking agent) to be added to the ethylenically unsaturated monomer before polymerization reaction include unsaturated polyesters obtained by reacting polyols such as diols and triols, e.g., (poly)ethylene glycol ("polyethylene glycol" and "ethylene glycol" are herein collectively referred to as "(poly) ethylene glycol"; the same applies below), (poly)propylene glycol, 1,4-butanediol, trimethylolpropane, and (poly)glycerin, with unsaturated acids such as (meth)acrylic acid, maleic acid, and fumaric acid; bisacrylamides such as N,N-methylenebisacrylamide; di or tri(meth)acrylic acid esters obtained by reacting polyepoxides with (meth)acrylic acid; carbamyl di(meth)acrylates obtained by reacting polyisocyanates such as tolylene diisocyanate and hexamethylene diisocyanate with hydroxyethyl (meth)acrylate; compounds having two or more polymerizable unsaturated groups such as allylated starch, allylated cellulose, diallyl phthalate, N,N',N"-triallylisocyanate, and divinylbenzene; polyglycidyl compounds such as diglycidyl compounds and triglycidyl compounds, e.g., (poly)ethylene glycol diglycidyl ether, (poly)propylene glycol diglycidyl ether, and (poly) glycerin diglycidyl ether; epihalohydrin compounds such as epichlorohydrin, epibromohydrin, and α-methylepichlorohydrin; compounds having two or more reactive functional groups such as isocyanate compounds, e.g., 2,4-tolylene diisocyanate and hexamethylene diisocyanate; and oxetane compounds such as 3-methyl-3-oxetanemethanol, 3-ethyl-3-oxetanemethanol, 3-butyl-3-oxetanemethanol, 3-methyl-3-oxetaneethanol, 3-ethyl-3-oxetaneethanol, and 3-butyl-3-oxetaneethanol. These internal-crosslinking agents may be used alone or in combinations of two or more.

When an internal-crosslinking agent is used, the amount of the internal-crosslinking agent used is preferably 0.00001 to 1 mol, and more preferably 0.0001 to 0.5 mol, per 100 mol of the ethylenically unsaturated monomer, in order to sufficiently increase the water-absorption ability of the resulting water-absorbent resin particles.

Hydrocarbon Dispersion Medium

Examples of the hydrocarbon dispersion medium to be used in the present invention include $C_{6-8}$ aliphatic hydrocarbons such as n-hexane, n-heptane, 2-methylhexane, 3-methylhexane, 2,3-dimethylpentane, 3-ethylpentane, and n-octane; alicyclic hydrocarbons such as cyclohexane, methylcyclohexane, cyclopentane, methylcyclopentane, trans-1,2-dimethylcyclopentane, cis-1,3-dimethylcyclopentane, and trans-1,3-dimethylcyclopentane; and aromatic hydrocarbons such as benzene, toluene, and xylene. These hydrocarbon dispersion media may be used alone or in combinations of two or more. Among these hydrocarbon dispersion media, n-hexane, n-heptane, and cyclohexane, which are readily industrially available, stable in quality, and inexpensive, are suitably used. Examples of mixtures of the above-mentioned hydrocarbon dispersion media include commercially available products such as Exxsol Heptane (Exxon Mobil Corporation; containing 75 to 85% by mass of heptane and its isomeric hydrocarbons). Favorable results can also be obtained using such a commercially available product.

Typically, the amount of the hydrocarbon dispersion medium used is preferably 100 to 1500 parts by mass, and more preferably 200 to 1400 parts by mass, per 100 parts by mass of the ethylenically unsaturated monomer in the first polymerization step, in order to homogeneously disperse the ethylenically unsaturated monomer, and facilitate control of the polymerization temperature. The above-mentioned first polymerization refers to the step in single-step polymerization or the first polymerization step in multi-step polymerization having two or more steps.

Surfactant

The surfactant to be used in the present invention is at least one selected from the group consisting of polyoxyethylene alkyl ether phosphates, alkali metal salts thereof, and alkaline earth metal salts thereof. Examples of the surfactant include lauryl phosphate, laureth-2 phosphate, laureth-4 phosphate, oleth-4 phosphate, sodium oleth-7 phosphate, steareth-2 phosphate, steareth-3 phosphate, (C12-15) pareth-3 phosphate, (C12-15) pareth-6 phosphate, (C12-15) pareth-9 phosphate, polyoxyethylene tridecyl ether phosphate, polyoxyethylene alkyl (C8) ether phosphate, polyoxyethylene alkyl (C10) ether phosphate, polyoxyethylene alkyl (C12, 13) ether phosphate, polyoxyethylene lauryl ether phosphate, sodium polyoxyethylene alkyl (C4) phosphate, sodium dilaureth-10 phosphate, sodium dioleth-8 phosphate, di(C12-15) pareth-2 phosphate, di(C12-15) pareth-4 phosphate, di(C12-15) pareth-6 phosphate, di(C12-15) pareth-8 phosphate, and di(C12-15) pareth-10 phosphate.

Among these surfactants, a polyoxyethylene alkyl ether phosphate sodium salt is preferred, and sodium oleth-7 phosphate, for example, is used.

The surfactant has an HLB of 9 to 15, which is a requirement for reducing the stirring load in a polymerization step in the production of the water-absorbent resin particles. On the other hand, if the HLB is outside the range of 9 to 15, the stirring load in a polymerization step will sharply increase.

The amount of the surfactant used is preferably 0.1 to 3 parts by mass, and more preferably 0.3 to 2 parts by mass, per 100 parts by mass of the ethylenically unsaturated monomer, in order to maintain a good dispersion state of the ethylenically unsaturated monomer in the hydrocarbon dispersion medium, and obtain a dispersion effect commensurate with the amount used. When reversed phase suspension polymerization is performed in two or more steps, the sum of the amounts of the surfactant in all the steps is used as the amount of the surfactant, and the sum of the amounts of the ethylenically unsaturated monomer in all the steps is used as the amount of the ethylenically unsaturated monomer.

Polymeric Dispersion Stabilizer

A polymeric dispersion stabilizer may also be used in combination with the surfactant. Examples of the polymeric dispersion stabilizer to be used include maleic anhydride modified polyethylene, maleic anhydride modified polypropylene, maleic anhydride modified ethylene-propylene copolymers, maleic anhydride modified EPDM (ethylene-propylene-diene terpolymers), maleic anhydride modified polybutadiene, maleic anhydride-ethylene copolymers, maleic anhydride-propylene copolymers, maleic anhydride-ethylene-propylene copolymers, maleic anhydride-butadiene copolymers, polyethylene, polypropylene, ethylene-propylene copolymers, oxidized polyethylene, oxidized polypropylene, oxidized ethylene-propylene copolymers, ethylene-acrylic acid copolymers, ethyl cellulose, and ethyl hydroxyethyl cellulose. These polymeric dispersion stabilizers may be used alone or in combinations of two or more. The amount of the polymeric dispersion stabilizer used is preferably 0.1 to 3 parts by mass, and more preferably 0.3 to 2 parts by mass, per 100 parts by mass of the ethylenically unsaturated monomer, in order to maintain a good dispersion state of the ethylenic ally unsaturated monomer in the hydrocarbon dispersion medium, and obtain a dispersion effect commensurate with the amount used. When reversed phase suspension polymerization is performed in two or more steps, the sum of the amounts of the surfactant in all the steps is used as the amount of the surfactant, and the sum of the amounts of the ethylenically unsaturated monomer in all the steps is used as the amount of the ethylenically unsaturated monomer.

Reversed Phase Suspension Polymerization

In the present invention, reversed phase suspension polymerization may be performed in one step, or two or more steps. Multi-step polymerization having two or more steps may be performed in order to improve productivity. In the case of multi-step polymerization, the number of steps is preferably 2 or 3. Reversed phase suspension polymerization having two or more steps may be performed as follows: the first-step reversed phase suspension polymerization is performed using the above-described method; subsequently, all the ethylenically unsaturated monomer is added to the reaction mixture obtained by the first-step polymerization reaction and mixed, and reversed phase suspension polymerization in the second and subsequent steps is performed in the same manner as in the first step. In reversed phase suspension polymerization in each of the second and subsequent steps, in addition to the ethylenically unsaturated monomer, a radical polymerization initiator and an optionally added internal-crosslinking agent are added within the above-described range of molar ratios of each component relative to the ethylenically unsaturated monomer, based on the amount of the ethylenically unsaturated monomer added during reversed phase suspension polymerization in each of the second and subsequent steps, and reversed phase suspension polymerization may be performed under the same conditions as those used in the above-described method.

Typically, the reaction temperature during the polymerization reaction is preferably 20 to 110° C., and more preferably 40 to 90° C., in order to allow the polymerization to proceed quickly to reduce the polymerization time for improved productivity, and remove the heat of polymerization more readily to perform a smooth reaction. Typically, the reaction time is preferably 0.1 to 4 hours.

Post-Crosslinking Step

In the present invention, after the polymerization of the ethylenically unsaturated monomer, a post-crosslinking step is preferably performed by adding a crosslinking agent. When the post-crosslinking step is performed by adding a crosslinking agent (post-crosslinking agent) after the polymerization, the water-absorption ability of the resulting water-absorbent resin particles can be increased, which makes them suitable for use in applications such as industrial materials such as water-blocking materials for cables and materials for preventing dew condensation.

Examples of the post-crosslinking agent to be used in the present invention include compounds having two or more reactive functional groups. Examples thereof include polyols such as ethylene glycol, propylene glycol, 1,4-butanediol, trimethylolpropane, glycerin, polyoxyethylene glycol, polyoxypropylene glycol, and polyglycerin; polyglycidyl compounds such as (poly)ethylene glycol diglycidyl ether, (poly)ethylene glycol triglycidyl ether, (poly)glycerin diglycidyl ether, (poly)glycerin triglycidyl ether, (poly)propylene glycol polyglycidyl ether, and (poly)glycerol polyglycidyl ether; haloepoxy compounds such as epichlorohydrin, epibromohydrin, and α-methylepichlorohydrin; compounds having two or more reactive functional groups such as isocyanate compounds, e.g., 2,4-tolylene diisocyanate and hexamethylene diisocyanate; oxetane compounds such as 3-methyl-3-oxetanemethanol, 3-ethyl-3-oxetanemethanol, 3-butyl-3-oxetanemethanol, 3-methyl-3-oxetaneethanol, 3-ethyl-3-oxetaneethanol, and 3-butyl-3-oxetaneethanol; oxazoline compounds such as 1,2-ethylenebisoxazoline; carbonate compounds such as ethylene carbonate; and hydroxyalkylamide compounds such as bis[N,N-di(β-hydroxyethyl)]adipamide. Among the above, polyglycidyl compounds such as (poly)ethylene glycol diglycidyl ether, (poly)ethylene glycol triglycidyl ether, (poly)glycerin diglycidyl ether, (poly)glycerin triglycidyl ether, (poly)propylene glycol polyglycidyl ether, and (poly)glycerol polyglycidyl ether are particularly preferred. These post-crosslinking agents may be used alone or in combinations of two or more.

When a post-crosslinking agent is used, the amount of the post-crosslinking agent used is preferably 0.001 to 1 mol, and more preferably 0.005 to 0.5 mol, based on total 100 mol of the ethylenically unsaturated monomer used for polymerization, in order to increase the water-absorption ability of the resulting water-absorbent resin particles.

The timing of the addition of the post-crosslinking agent is not particularly limited, so long as it is after the completion of polymerization. The post-crosslinking agent is preferably added in the presence of 1 to 400 parts by mass of water, more preferably 5 to 200 parts by mass of water, and most preferably 10 to 100 parts by mass of water, per 100 parts by mass of the ethylenically unsaturated monomer.

The post-crosslinking agent may be added as is or as an aqueous solution. As required, the post-crosslinking agent may be added as a solution in which a hydrophilic organic solvent is used as a solvent.

Examples of the hydrophilic organic solvent include lower alcohols such as methyl alcohol, ethyl alcohol, n-propyl alcohol, isopropyl alcohol, and propylene glycol; ketones such as acetone and methyl ethyl ketone; ethers such as diethyl ether, dioxane, and tetrahydrofuran; amides such as N,N-dimethylformamide; and sulfoxides such as dimethylsulfoxide. These hydrophilic organic solvents may be used alone or in combinations of two or more, or as a mixture with water.

The temperature during the post-crosslinking step is preferably 50 to 250° C., more preferably 60 to 180° C., and still more preferably 70 to 150° C. The time of the post-crosslinking step is typically 1 to 300 minutes, and preferably 5 to 200 minutes.

Drying Step

The method for producing water-absorbent resin particles according to the present invention may include a drying step of adding external energy such as heat to remove the water, the hydrocarbon dispersion medium, and the like by distillation. The drying step may be performed under atmospheric pressure or reduced pressure, and may be performed in a stream of nitrogen or the like to increase the drying efficiency. When the drying step is performed under atmospheric pressure, the drying temperature is preferably 70 to 250° C., more preferably 80 to 180° C., and still more preferably 80 to 140° C. When the drying step is performed under reduced pressure, the drying temperature is preferably 40 to 160° C., more preferably 50 to 120° C., and still more preferably 60 to 90° C.

Other Additives

Additives such as a lubricant may also be added to the water-absorbent resin particles of the present invention, according to the purpose. The water-absorbent resin particles thus obtained are suitable for use in applications such as industrial materials such as water-blocking materials for cables and materials for preventing dew condensation.

2. Water-Absorbent Resin Particles

The median particle diameter of the water-absorbent resin particles obtained using the method of the present invention cannot be unequivocally defined since it will vary depending on the intended use; for example, for use in applications such as industrial materials such as water-blocking materials for cables and materials for preventing dew condensation, the median particle diameter is preferably 75 to 130 µm, and more preferably 90 to 120 µm.

EXAMPLES

The present invention will be hereinafter described in detail based on examples and comparative examples, although the present invention is not limited to these examples only.

The performance of the water-absorbent resin particles obtained in each of the examples and comparative examples was evaluated using the following methods.

(1) Stirring Load

A high-power general-purpose stirrer BLh1200R (SHINTO Scientific Co., Ltd.) was connected to a personal computer for data collection, and loads (N·m) on the stirrer during polymerization were continuously recorded. The maximum load value until the completion of polymerization was determined as the stirring load. Recording was continued from the start point of polymerization when heating was started by immersing the raw material in a water bath at 70° C. to the end point of polymerization when 60 minutes had elapsed from the start of heating.

(2) Median Particle Diameter

JIS standard sieves having openings of 500 µm, 250 µm, 180 µm, 150 µm, 106 µm, 75 µm, and 45 µm, and a receiving tray were combined in this order from the top. About 50 g of water-absorbent resin particles was placed on the top sieve of the combined sieves, and shaken for 10 minutes with a Ro-Tap shaker to conduct classification. After the classification, the mass of the water-absorbent resin particles remaining on each sieve was calculated as the mass percentage relative to the total mass of the water-absorbent resin particles, and the mass percentage was integrated in descending order of particle diameter. Thereafter, the relationship between the sieve opening and the integrated value of the mass percentage of the water-absorbent resin particles remaining on the sieve was plotted on logarithmic probability paper. The plots on the probability paper were connected with straight lines, and a particle diameter equivalent to 50% by mass of the integrated mass percentage was determined as the median particle diameter.

Example 1

A 2-L cylindrical round-bottomed separable flask having an inside diameter of 100 mm, equipped with a reflux condenser, a dropping funnel, a nitrogen gas inlet tube, a high-power general-purpose stirrer BLh1200R (SHINTO Scientific Co., Ltd.) connected to a personal computer for data collection, and a stirrer having stirring blades composed of two sets of four inclined paddle blades with a blade diameter of 50 mm, was prepared. 479 g of n-heptane was placed in the flask, and 1.150 g of sodium oleth-7 phosphate having an HLB of 14.4 (trade name: PHOSPHANOL RD-720N from TOHO Chemical Industry Co., Ltd.) as a surfactant was added thereto. The mixture was heated to 50° C. with stirring, and then cooled to 33° C. Separately, 92 g of an 80.5% by mass aqueous solution of acrylic acid and 45 g of ion exchange water were placed in a 500-mL Erlenmeyer flask, and 102.9 g of a 30% by mass aqueous solution of sodium hydroxide was added dropwise with external cooling to accomplish 75 mol % neutralization. Thereafter, 0.101 g of potassium persulfate as a radical polymerization initiator was added and dissolved. An aqueous monomer solution was thus prepared.

The rotation speed of the stirrer was adjusted to 900 r/min. Then, the aqueous monomer solution was added all at once to the separable flask, and kept at 33° C. for 30 minutes while replacing the atmosphere within the system with nitrogen. Thereafter, the separable flask was immersed in a water bath at 70° C. and heated, and polymerization was performed for 60 minutes. The stirring load in the polymerization step was $0.3 \times 10^{-1}$ N·m.

After polymerization, the rotation speed of the stirrer was changed to 1000 r/min. The separable flask was heated using an oil bath at 125° C., and 87 g of water was removed out of the system while refluxing n-heptane, using azeotropic distillation of water and n-heptane. Thereafter, 4.14 g of a 2% by mass aqueous solution of ethylene glycol diglycidyl ether as a post-crosslinking agent was added, and a post-crosslinking step was performed at 80° C. for 2 hours. Subsequently, water and n-heptane were removed by distillation, and the reaction mixture was dried to obtain 71 g of water-absorbent resin particles. Table 1 shows the median particle diameter of the resulting water-absorbent resin particles.

Example 2

The same procedure as in Example 1 was repeated, except that 1.104 g of laureth-4 phosphate having an HLB of 9.9 (trade name: PHOSPHANOL RD-510Y from TOHO Chemical Industry Co., Ltd.) was used as a surfactant instead of sodium oleth-7 phosphate. The stirring load in the polymerization step was $0.7 \times 10^{-1}$ N·m. Water-absorbent resin particles were obtained in an amount of 72 g. Table 1 shows the median particle diameter of the water-absorbent resin particles.

Example 3

The same procedure as in Example 1 was repeated, except that 2.074 g of (C12-15) pareth-6 phosphate having an HLB of 10.5 (trade name: PHOSPHANOL RS-610 from TOHO Chemical Industry Co., Ltd.) was used as a surfactant instead of sodium oleth-7 phosphate. The stirring load in the polymerization step was $0.8 \times 10^{-1}$ N·m. Water-absorbent resin particles were obtained in an amount of 72 g. Table 1 shows the median particle diameter of the water-absorbent resin particles.

Comparative Example 1

The same procedure as in Example 1 was repeated, except that 1.104 g of sorbitan monolaurate having an HLB of 8.6 described in Patent Literature 1 (trade name: NONION LP-20R from NOF Corporation) was used as a surfactant instead of sodium oleth-7 phosphate. The stirring load in the polymerization step was $1.7 \times 10^{-1}$ N·m. Water-absorbent resin particles were obtained in an amount of 71 g. Table 1 shows the median particle diameter of the water-absorbent resin particles.

Comparative Example 2

The same procedure as in Comparative Example 1 was repeated, except that the amount of sorbitan monolaurate used as a surfactant was changed to 2.370 g. The stirring load in the polymerization step was $1.6 \times 10^{-1}$ N·m. Water-absorbent resin particles were obtained in an amount of 72 g. Table 1 shows the median particle diameter of the water-absorbent resin particles.

Comparative Example 3

The same procedure as in Example 1 was repeated, except that 1.115 g of polyoxyethylene tridecyl ether phosphate having an HLB of 15.1 described in Patent Literature 2 (trade name: PLYSURF A212C from DKS Co., Ltd) was used as a surfactant instead of sodium oleth-7 phosphate. The stirring load in the polymerization step was $1.3 \times 10^{-1}$ N·m. Water-absorbent resin particles were obtained in an amount of 70 g. Table 1 shows the median particle diameter of the water-absorbent resin particles.

TABLE 1

| | Surfactant | Amount of Surfactant (Based on Ethylenically Unsaturated Monomer, wt %) | HLB | Stirring Load ($\times 10^{-1}$ N·m) | Median Particle Diameter (μm) |
|---|---|---|---|---|---|
| Example 1 | Sodium Oleth-7 Phosphate | 1.5 | 14.4 | 0.3 | 92 |
| Example 2 | Laureth-4 Phosphate | 1.5 | 9.9 | 0.7 | 75 |
| Example 3 | (C12-15) Pareth-6 Phosphate | 2.8 | 10.5 | 0.8 | 79 |
| Comparative Example 1 | Sorbitan Monolaurate | 1.5 | 8.6 | 1.7 | 129 |
| Comparative Example 2 | Sorbitan Monolaurate | 3.2 | 8.6 | 1.6 | 123 |
| Comparative Example 3 | Polyoxyethylene Tridecyl Ether Phosphate | 1.5 | 15.1 | 1.3 | 109 |

As shown in Table 1, in Examples 1 to 3, the stirring load in the polymerization step was low, and the median particle diameter was within a range suitable for applications such as industrial materials such as water-blocking materials for cables and materials for preventing dew condensation. On the other hand, in Comparative Examples 1 to 3, the stirring load in the polymerization step was high, and the median particle diameter was larger than a suitable range.

Example 4

A 2-L cylindrical round-bottomed separable flask having an inside diameter of 100 mm, equipped with a reflux condenser, a dropping funnel, a nitrogen gas inlet tube, a high-power general-purpose stirrer BLh1200R (SHINTO Scientific Co., Ltd.) connected to a personal computer for data collection, and a stirrer having stirring blades composed of two sets of four inclined paddle blades with a blade diameter of 50 mm, was prepared. 338 g of n-heptane was added to the flask, and 1.150 g of sodium oleth-7 phosphate having an HLB of 14.4 (trade name: PHOSPHANOL RD-720N from TOHO Chemical Industry Co., Ltd.) as a surfactant was added thereto. The mixture was heated to 50° C. with stirring, and then cooled to 33° C. Separately, 92 g of an 80.5% by mass aqueous solution of acrylic acid and 45 g of ion exchange water were placed in a 500-mL Erlenmeyer flask, and 102.9 g of a 30% by mass aqueous solution of sodium hydroxide was added dropwise with external cooling to accomplish 75 mol % neutralization. Thereafter, 0.101 g of potassium persulfate as a radical polymerization initiator was added and dissolved. An aqueous monomer solution in the first polymerization step was thus prepared.

The rotation speed of the stirrer was adjusted to 900 r/min. Then, the aqueous monomer solution was added all at once to the separable flask, and kept at 33° C. for 30 minutes while replacing the atmosphere within the system with nitrogen. Thereafter, the separable flask was immersed in a water bath at 70° C. and heated, and polymerization was performed for 60 minutes. The stirring load in the first polymerization step was $0.3 \times 10^{-1}$ N·m.

Next, separately from the first polymerization step, 92 g of an 80.5% by mass aqueous solution of acrylic acid and 50 g of ion exchange water were placed in a 500-mL Erlenmeyer flask, and 64.3 g of a 48% by mass aqueous solution of sodium hydroxide was added dropwise with external cooling to accomplish 75 mol % neutralization. Thereafter, 0.101 g of potassium persulfate as a radical polymerization initiator was added and dissolved. An aqueous monomer solution in the second polymerization step was thus prepared.

The rotation speed of the stirrer was adjusted to 1000 r/min. Then, the aqueous monomer solution was added all at once to the separable flask, and the atmosphere within the system was replaced with nitrogen gas for 30 minutes. Thereafter, the separable flask was immersed in a water bath at 70° C. to heat the interior of the system, and polymerization was performed for 60 minutes. The stirring load in the second polymerization step was $0.1 \times 10^{-1}$ N·m.

After polymerization, the separable flask was heated using an oil bath at 125° C., and 197 g of water was removed out of the system while refluxing n-heptane, using azeotropic distillation of water and n-heptane. Thereafter, 8.28 g of a 2% by mass aqueous solution of ethylene glycol diglycidyl ether as a post-crosslinking agent was added, and a post-crosslinking step was performed at 80° C. for 2 hours. Subsequently, water and n-heptane were removed by distillation, and the reaction mixture was dried to obtain 172 g of water-absorbent resin particles. Table 2 shows the median particle diameter of the resulting water-absorbent resin particles.

Example 5

The same procedure as in Example 4 was repeated, except that 1.127 g of laureth-2 phosphate having an HLB of 12.5 (trade name: PHOSPHANOL ML-220 from TOHO Chemical Industry Co., Ltd.) was used as a surfactant instead of sodium oleth-7 phosphate. The stirring load in the first polymerization step was $0.5 \times 10^{-1}$ N·m, and the stirring load in the second polymerization step was $0.3 \times 10^{-1}$ N·m. Water-absorbent resin particles were obtained in an amount of 174 g. Table 2 shows the median particle diameter of the water-absorbent resin particles.

Comparative Example 4

The same procedure as in Example 4 was repeated, except that 1.104 g of sorbitan monolaurate having an HLB of 8.6 described in Patent Literature 1 (trade name: NONION LP-20R from NOF Corporation) was used as a surfactant instead of sodium oleth-7 phosphate. The stirring load in the first polymerization step was $1.4 \times 10^{-1}$ N·m, and the stirring load in the second polymerization step was $1.1 \times 10^{-1}$ N·m. Water-absorbent resin particles were obtained in an amount of 174 g. Table 2 shows the median particle diameter of the water-absorbent resin particles.

TABLE 2

| | Surfactant | Amount of Surfactant (Based on Ethylenically Unsaturated Monomer, wt %) | HLB | Stirring Load ($\times 10^{-1}$ N·m) First Step | Stirring Load ($\times 10^{-1}$ N·m) Second Step | Median Particle Diameter (μm) |
|---|---|---|---|---|---|---|
| Example 4 | Sodium Oleth-7 Phosphate | 0.8 | 14.4 | 0.3 | 0.1 | 112 |
| Example 5 | Laureth-2 Phosphate | 0.8 | 12.5 | 0.5 | 0.3 | 129 |
| Comparative Example 4 | Sorbitan Monolaurate | 0.8 | 8.6 | 1.4 | 1.1 | 172 |

As shown in Table 2, in Examples 4 and 5, the stirring loads in the polymerization steps were low, and the median particle diameter was within a range suitable for applications such as industrial materials such as water-blocking materials for cables and materials for preventing dew condensation. On the other hand, in Comparative Example 4, the stirring loads in the polymerization steps were high, and the median particle diameter was larger than a suitable range.

INDUSTRIAL APPLICABILITY

In accordance with the present invention, a method for producing water-absorbent resin particles can be provided that has a low stirring load in a polymerization step and high productivity.

The invention claimed is:

1. A method for producing water-absorbent resin particles comprising:
    adding an ethylenically unsaturated monomer all at once to a hydrocarbon dispersion medium mixed with a surfactant to perform reversed phase suspension polymerization, wherein
    the reversed phase suspension polymerization is performed in one step, or two or more steps,
    the surfactant is at least one selected from the group consisting of polyoxyethylene alkyl ether phosphates, alkali metal salts of polyoxyethylene alkyl ether phosphates, and alkaline earth metal salts of polyoxyethylene alkyl ether phosphates, and the surfactant has an HLB of 9.0 to 15.0.

2. The method for producing water-absorbent resin particles according to claim 1, wherein the surfactant is a polyoxyethylene alkyl ether phosphate sodium salt.

3. The method for producing water-absorbent resin particles according to claim 1, wherein the surfactant is used in an amount of 0.1 to 3.0 parts by mass per 100 parts by mass of the ethylenically unsaturated monomer.

4. The method for producing water-absorbent resin particles according to claim 1, wherein the ethylenically unsaturated monomer is at least one selected from the group consisting of (meth)acrylic acid and salts thereof.

5. The method according to claim 1, wherein the surfactant is at least one selected from the group consisting of sodium oleth-7-phosphate, Laureth-2 phosphate, laureth-4 phosphate and (C12-15) pareth-6 phosphate.

* * * * *